Oct. 28, 1952          P. D. BECKER          2,615,759
HUBCAP
Filed June 16, 1949
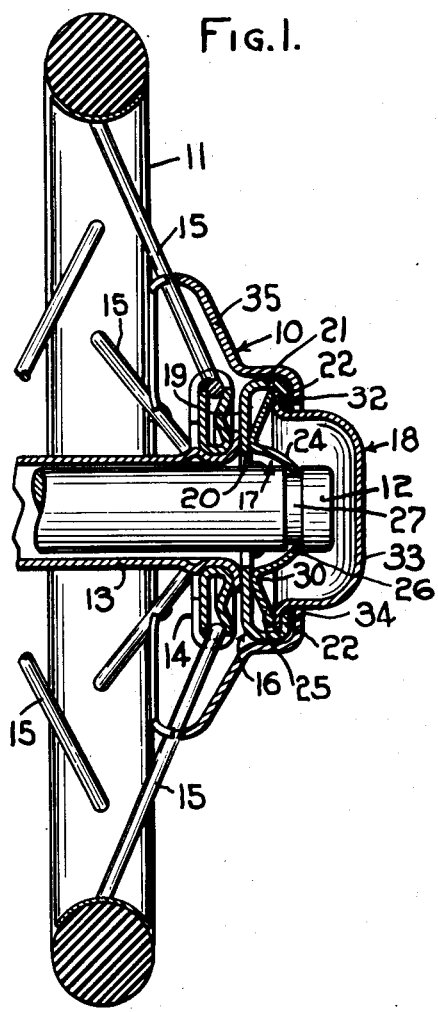
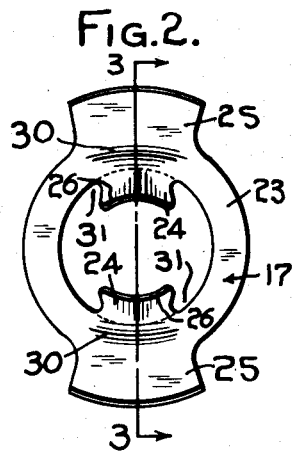
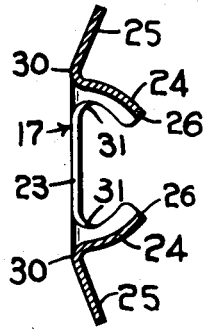
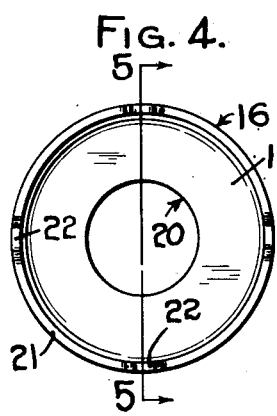
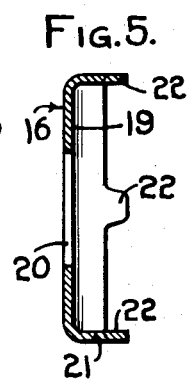
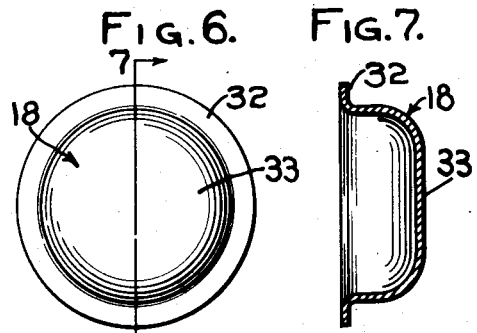
INVENTOR:
PHILIP D. BECKER,
BY Philip E. Parker
ATTORNEY.

Patented Oct. 28, 1952

2,615,759

UNITED STATES PATENT OFFICE 2,615,759

HUBCAP

Philip D. Becker, Hingham, Mass., assignor to United-Carr Fastener Corporation, Cambridge, Mass., a corporation of Massachusetts Application June 16, 1949, Serial No. 99,423

3 Claims. (Cl. 301—112)

This invention relates to wheel-retaining hub cap assemblies such as used for retaining a wheel on the axle of a carriage or like vehicle, and aims generally to improve existing devices of this type.

A primary object of the invention is the provision of an improved wheel-retaining hub cap assembly which positively retains a wheel in mounted position on an axle but which, nevertheless, permits the wheel to be removed therefrom and/or secured thereon very easily.

Another object of the invention is the provision of a wheel-retaining hub cap assembly for carriage and like vehicle wheels wherein means are provided for quickly releasing and removing the wheel.

Still another object of the invention is the provision of a quick release mechanism for carriage and like vehicle wheels which may be disposed in the hub caps frequently used with such wheels.

A further object of the invention is the provision of a wheel-retaining hub cap assembly for carriage and like vehicle wheels which may be quickly and easily released merely by pressing parts of the assembly together.

A still further object of the invention is the provision of a wheel-retaining hub cap assembly which is simple and economical in construction, positive in operation, and easy to install and remove.

These and other objects and advantages of the invention will be apparent to persons skilled in the art from a consideration of the attached drawings and annexed specification illustrating and describing a preferred embodiment of the invention.

In the drawings—

Fig. 1 is a vertical cross-sectional view of the wheel-retaining hub cap assembly mounted on the axle of a carriage or like vehicle;

Fig. 2 is a plan view of the wheel-retaining ratchet;

Fig. 3 is a cross-sectional view of the wheel-retaining ratchet taken on the line 3—3 of Fig. 2;

Fig. 4 is a plan view of the ratchet clamping ring;

Fig. 5 is a cross-sectional view of the ratchet clamping ring taken on the line 5—5 of Fig. 4;

Fig. 6 is a plan view of the button cap; and

Fig. 7 is a cross-sectional view of the button cap taken on the line 7—7 of Fig. 6.

Referring now to the drawing, the numeral 10 denotes the wheel-retaining hub cap assembly of the invention for retaining a wheel 11 of a carriage or like vehicle on an axle 12. The wheel 11 may be of any suitable type such as a wire wheel having a hub 13, spoke ring 14 mounted on the hub, and wire spokes 15 connected to the rim of the wheel and to the spoke ring 14.

In accordance with the invention the improved wheel-retaining hub cap assembly 10 may desirably comprise a bearing or back plate 16 secured to the hub 13, a ratchet plate 17 releasably engaged with the axle 12 and adapted to bear against the back plate 16 to retain the wheel 11 mounted thereon, and a pressure plate or button cap 18 held in position over the end of the axle 12 by the bearing plate 16 and movable inwardly in response to pressure applied thereto to release the ratchet plate 17 from engagement with the axle 12.

The bearing plate 16 may desirably comprise a flanged bearing portion 19 apertured at 20 to receive the axle 12 and an annular rim portion 21 extending laterally from the flanged bearing portion 19 and having tabs or projections 22 adapted to secure the button cap 18 in mounted position as will appear more clearly hereinafter. The bearing plate 16 may be mounted loosely on axle 12 and retained thereon and in abutting relationship with the spoke ring 14 by the ratchet plate 17.

The ratchet plate 17 is preferably made of a resilient material such as spring metal, and may desirably comprise an annular body portion 23 having inwardly extending locking fingers 24 and outwardly extending pressure fingers or projections 25. The locking fingers 24 curve inwardly from the body portion 23 in converging relationship and are provided with convexly curved end portions 26 adapted to engage an annular groove 27 in the axle 12 to retain the ratchet in assembled position thereon. Two or more of the fingers 24 may be used as desired, two being shown for purposes of exemplification.

The pressure fingers or projections 25 extend outwardly from the body portion 23 in diverging relationship with the fingers 24 and are adapted to be pressed inwardly by the button cap 18 to pivot the body portion 23 counterclockwise against the flanged bearing plate 16 as a fulcrum to swing the fingers 24 out of engagement with the annular groove 27. This releases the ratchet from the axle 12 and permits the ratchet and wheel to be removed from the axle.

In order to facilitate such pivoting movement the body 23, between the fingers 24 and 25, or if desired the entire body portion 23, is preferably curved in cross-sectional shape with the convexly curved portion 30 thereof disposed opposite the flanged bearing portion 19 of the bearing plate 16. This permits the body portion 23 to rock on the flanged bearing portion 19 so that it may readily be pivoted by inward movement of the projections 25. Pivoting movement of the body portion 23 and outward swinging movement of the fingers 24 is further facilitated by providing relatively large rounded recesses 31 between the fingers 24.

The fingers 24 may be swung outwardly from engagement with the groove 27 by the button cap or pressure plate 18, which has a flange 32 adapted to contact the outwardly extending projections 25, and a dome-shaped portion 33 adapted to cover the outer end of the axle 12. The button cap 18 may extend through an opening 34 in a hub cap 35 and is held in assembled relationship with the bearing plate 16 by bending the tabs 22 inwardly over the flange 32.

In the assembled position of the device shown in Fig. 1 the wheel 11 is retained in position on the axle 12 by engagement of the body portion 23 of the ratchet plate 17 with the flanged bearing portion 19 of the bearing plate 16, the ratchet plate 17, of course, being secured on the axle 12 by engagement of the spring fingers 24 with the groove 27. If it is desired to remove the wheel 11, the button cap or pressure plate 18 is moved inwardly so that the flange 32 thereof contacts and presses the fingers 25 inwardly toward the bearing portion 19. This causes the body portion 23 to pivot on the bearing portion 19 as a fulcrum to thus swing the fingers 24 outwardly out of engagement with the groove 27. The wheel 11 and wheel-retaining hub cap assembly 10 may then be slid to the right and removed from the axle.

It will thus be seen that the present invention provides a simple, economical and highly effective wheel-retaining hub cap assembly which may be easily and quickly mounted on or removed from an axle.

Various modifications of the invention described and illustrated will most likely occur to those skilled in the art to which the invention relates, and may be made without departing from the spirit of the invention, the scope of which is indicated in the attached claims.

I claim:

1. A wheel-retaining hub cap assembly for retaining a wheel on a grooved axle comprising a resilient ratchet plate having a body portion, a plurality of locking fingers extending inwardly from said body portion for engagement with said groove, a plurality of pressure fingers extending outwardly from said body portion in diverging relationship to said locking fingers, a backing plate mounted on said wheel inwardly of said ratchet plate and having a portion thereof adapted to contact said body portion, and a pressure plate mounted outwardly of said ratchet plate and movable inwardly into pressure contact with said pressure fingers, said backing plate serving as a fulcrum for said body portion whereby inward movement of said pressure plate against said pressure fingers causes pivoting of the body portion to release said locking fingers from engagement with said groove.

2. A wheel retaining hub cap assembly for releasably securing a wheel on an axle comprising a bearing plate and a pressure plate, rim means for maintaining said plates in superposed relationship, and a ratchet plate having a body portion radially spaced from and circumferentially disposed about an axis in engagement with said bearing plate, a plurality of resilient locking fingers extending radially inwardly and away from said bearing plate and adapted to engage a groove of an axle to secure the assembly thereon, and a plurality of pressure fingers extending radially outwardly and away from said bearing plate and providing end portions in engagement with said pressure plate, whereby upon the application of compressive forces to said plates said locking fingers are caused to swing radially outwardly.

3. A fastening device for securing a wheel on an axle comprising a bearing plate, a pressure plate, rim means for maintaining said plates in alignment, and a ratchet plate having a pair of spaced fulcrum portions in engagement with a face of said bearing plate facing said pressure plate, a pair of resilient locking arms extending angularly inwardly toward each other and away from said bearing plate and said fulcrum portions, and a pair of pressure fingers extending angularly outward from each other and away from said bearing plate and said fulcrum portions to dispose their free ends in engagement with said pressure plate, whereby the application of pressure tending to bring the bearing and pressure plates together will cause equal and opposite pressures to be applied to said pressure fingers and said fulcrum portions and thereby cause said locking fingers to spread outwardly away from each other to release said locking fingers from a groove of an axle with which they may be engaged.

PHILIP D. BECKER.

REFERENCES CITED

The following references are of record in the file of this patent:

UNITED STATES PATENTS

| Number | Name | Date |
| --- | --- | --- |
| 745,989 | Ayres | Dec. 8, 1903 |
| 1,046,549 | Bridges | Dec. 10, 1912 |
| 1,540,503 | White | June 2, 1925 |
| 2,266,049 | Kost | Dec. 16, 1941 |
| 2,321,158 | Rees | June 8, 1943 |
| 2,503,854 | Trainor | Apr. 11, 1950 |

FOREIGN PATENTS

| Number | Country | Date |
| --- | --- | --- |
| 566,446 | Great Britain | Dec. 29, 1944 |